United States Patent
Faruque et al.

(10) Patent No.: US 10,562,420 B2
(45) Date of Patent: Feb. 18, 2020

(54) VEHICLE SEAT INCLUDING ENERGY ABSORBING DEVICE

(71) Applicant: Ford Global Technologies, LLC, Dearborn, MI (US)

(72) Inventors: Mohammad Omar Faruque, Ann Arbor, MI (US); James Chih Cheng, Troy, MI (US); Robert William McCoy, Ann Arbor, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/585,681

(22) Filed: May 3, 2017

(65) Prior Publication Data
US 2018/0319295 A1 Nov. 8, 2018

(51) Int. Cl.
*B60N 2/427* (2006.01)
*B60N 2/42* (2006.01)

(52) U.S. Cl.
CPC ....... *B60N 2/42745* (2013.01); *B60N 2/4228* (2013.01)

(58) Field of Classification Search
CPC .. B60N 2/42745; B60N 2/4228; B60N 2/433; B60N 2/2227; F16F 9/145
USPC .............. 297/216.1, 216.15–216.18, 354.12, 297/361.1–377, 216.13, 216.14
See application file for complete search history.

(56) References Cited

U.S. PATENT DOCUMENTS

| 4,589,301 A |   | 5/1986  | Griner |                        |
|-------------|---|---------|--------|------------------------|
| 5,152,189 A | * | 10/1992 | Miura  | F16F 9/145             |
|             |   |         |        | 464/180                |
| 5,597,205 A | * | 1/1997  | Glance | B60N 2/233             |
|             |   |         |        | 297/216.1              |

(Continued)

FOREIGN PATENT DOCUMENTS

CN 204095590 U 1/2015
JP 200356620 A 2/2003

(Continued)

OTHER PUBLICATIONS

Machine translation for foreign reference WO-2007108197-A1, obtained from https://patentscope.wipo.int/search/en/detail.jsf?docId=WO2007108197&recNum=1&maxRec=&office=&prevFilter=&sortOption=&queryString=&tab=PCTDescription (last accessed on Jun. 5, 2018) (Year: 2018).*

(Continued)

*Primary Examiner* — Theodore V Adamos
(74) *Attorney, Agent, or Firm* — Frank A. MacKenzie; Bejin Bieneman PLC

(57) ABSTRACT

A seat including a seat bottom, a seatback, and a device. The device supports the seatback on the seat bottom. The device includes a housing supported on the seat bottom and a rotor supported on the housing. The device includes a helical interface between the housing and the rotor. The rotor is moveable relative to the housing along the helical interface. The housing and the rotor define a cavity therebetween, and a resilient material is disposed in the cavity. During a vehicle impact, the rotor may move relative to the housing and compress the resilient material in the cavity. In this situation, the resilient material may absorb energy from the vehicle impact.

20 Claims, 9 Drawing Sheets

(56) References Cited

U.S. PATENT DOCUMENTS

| | | | | |
|---|---|---|---|---|
| 5,722,722 | A * | 3/1998 | Massara | B60N 2/4228 297/216.13 |
| 6,050,637 | A * | 4/2000 | Håland | B60N 2/4228 297/216.14 |
| 6,102,439 | A * | 8/2000 | Smithson | B60R 22/28 280/805 |
| 6,296,306 | B1 * | 10/2001 | Specht | B60N 2/0232 297/216.14 |
| 6,312,049 | B1 * | 11/2001 | Sullivan | B60N 2/0232 297/216.1 |
| 6,474,734 | B1 * | 11/2002 | Masuda | B60N 2/4214 297/216.13 |
| 6,659,505 | B1 | 12/2003 | Knox | |
| 7,931,332 | B2 * | 4/2011 | Andou | B60R 21/0136 297/216.13 |
| 8,210,608 | B2 * | 7/2012 | Igarashi | B60N 2/42781 297/216.12 |
| 9,194,454 | B2 | 11/2015 | Okimura et al. | |
| 2006/0145522 | A1 * | 7/2006 | Yamada | B60N 2/236 297/367 R |
| 2011/0121622 | A1 * | 5/2011 | Okimura | B60N 2/4228 297/216.12 |
| 2011/0139558 | A1 * | 6/2011 | Cultraro | F16F 9/145 188/322.15 |
| 2013/0276268 | A1 * | 10/2013 | Li | E05F 5/00 16/353 |
| 2013/0328342 | A1 * | 12/2013 | Okimura | B60N 2/20 296/66 |
| 2014/0020994 | A1 * | 1/2014 | Okimura | B60N 2/22 188/282.1 |
| 2014/0125096 | A1 * | 5/2014 | Barzen | B60N 2/2356 297/216.13 |

FOREIGN PATENT DOCUMENTS

| | | |
|---|---|---|
| JP | 2014190502 A | 10/2014 |
| KR | 10-1241027 A | 3/2013 |
| WO | 2005118332 A3 | 12/2005 |
| WO | WO-2007108197 A1 * | 9/2007 ............... F16F 9/145 |

OTHER PUBLICATIONS

GB Search Report dated Oct. 24, 2018 re GB Appl. No. 1806847.8.

* cited by examiner

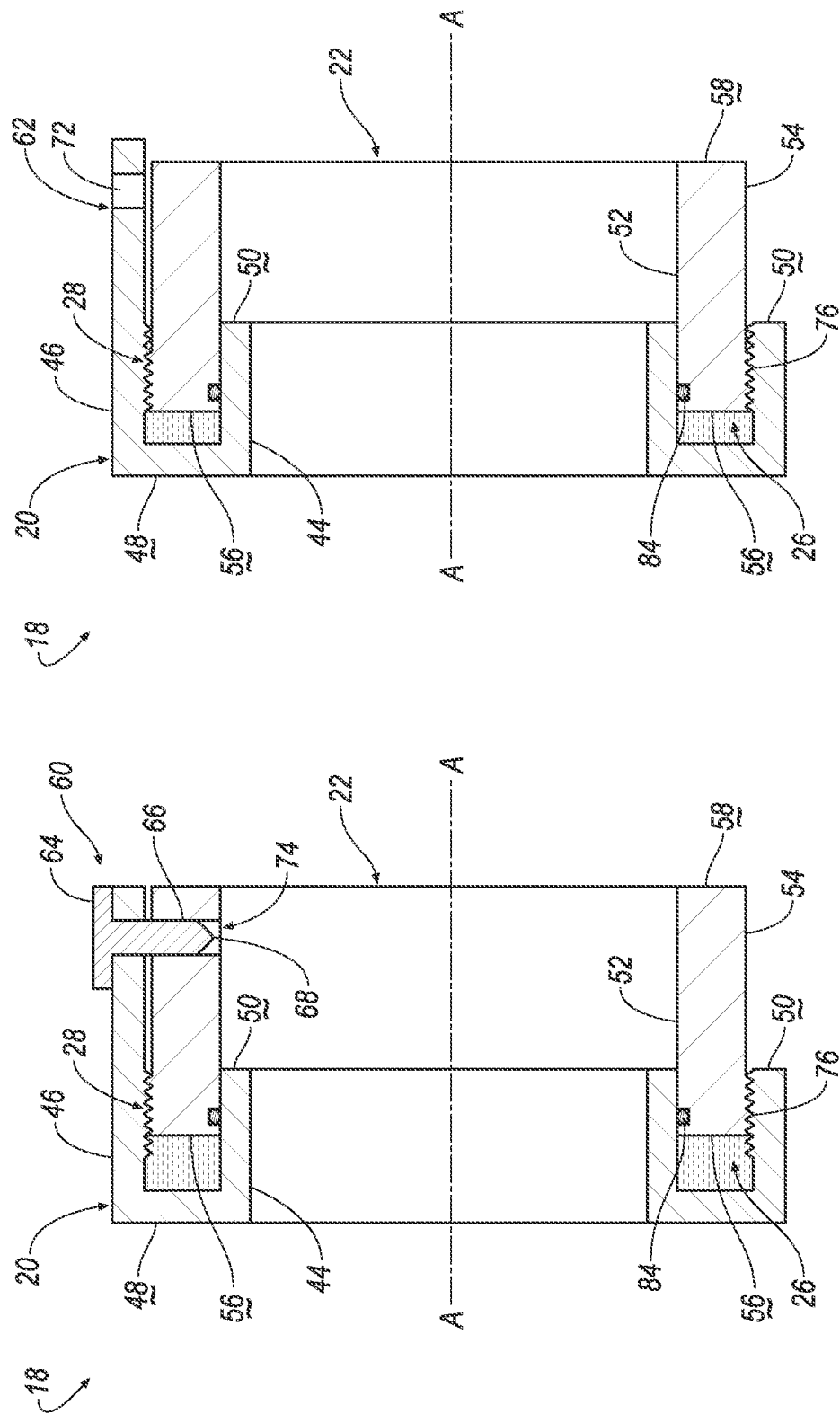

VEHICLE SEAT INCLUDING ENERGY ABSORBING DEVICE

BACKGROUND

A vehicle, such as an automobile, may include multiple seats. The seats may be bucket seats, bench seats, or other kinds, and the seats may face forward relative to the vehicle. The seats include seat bottoms on which occupants sit and seatbacks against which occupants rest their backs. The seat bottoms are generally horizontal and the seatbacks are generally upright.

During a vehicle impact, the vehicle decelerates before the occupant decelerates. Specifically, during a rear vehicle impact, the occupant may still have rearward momentum after the vehicle has decelerated. In this situation, the occupant may be forced into, i.e., impact, the seatback of the seat the occupant occupies.

BRIEF DESCRIPTION OF THE DRAWINGS

FIG. 5A is a cross sectional view along an axis of the device with the resilient material in an uncompressed state.

FIG. 5B is a cross sectional view along the axis of the device with the resilient material in a compressed state.

DETAILED DESCRIPTION

A seat including a seat bottom, a seatback, and a device supporting the seatback on the seat bottom. The device includes a housing supported on the seat bottom and a rotor supported on the housing. The rotor and the housing define a cavity therebetween. The device includes a helical interface between the housing and the rotor. The rotor is moveable relative to the housing along the helical interface. A resilient material is disposed in the cavity.

The housing may include an inner wall and an outer wall extending annularly about the inner wall. The cavity may extend annularly about the inner wall between the inner wall and the outer wall. The device may include an O-ring disposed in the cavity. The O-ring may abut both the rotor and the housing.

The helical interface may include threads on both the housing and the rotor. The threads of the housing and the threads of the rotor may be engageable with each other. The helical interface may be in the cavity on at least one of the inner wall and the outer wall.

The resilient material may include a liquid and hydrophobic nanoporous particles in the liquid. The resilient material may abut both the rotor and the housing in the cavity.

The device may include a reclining mechanism. The reclining mechanism may include a gear fixed to one of the housing and the rotor. The other of the housing and the rotor may be fixed to the seatback. The seat bottom may include a locking gear releasably engageable with the gear of the reclining mechanism.

The housing and the rotor may include locking elements releasably engageable with each other.

Figure 1A:
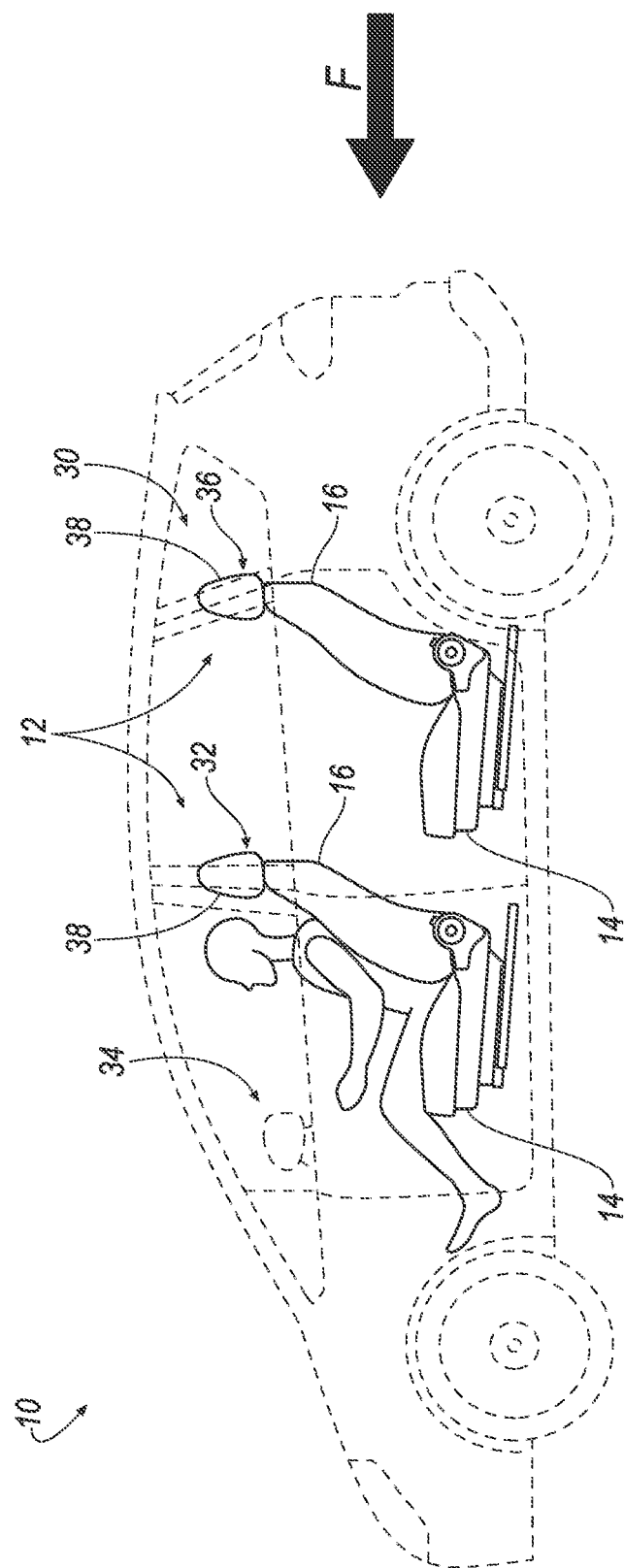
FIG. 1A is a side view of a vehicle including a front seat having a seat bottom and a seatback supported on the seat bottom and moveable relative to the seat bottom.

With reference to the Figures, wherein like numerals indicate like parts throughout the several views, a vehicle 10 is generally shown. The vehicle 10 includes a seat 12 having a seat bottom 14, a seatback 16, and a device 18 supporting the seatback 16 on the seat bottom 14, i.e., the device 18 supports the seatback 16 on the seat bottom 14 directly or through intermediate components, as shown in FIG. 2. During a vehicle impact, the momentum of an occupant biases the occupant relative to the seatback 16. For example, in a front impact or a rear impact, the momentum of an occupant may bias the occupant away from or toward the seatback 16, respectively. When the occupant impacts the seatback 16 of the seat 12 during a rear impact, the device 18 may allow the seatback 16 to pivot relative to the seat bottom 14. Specifically, during a rear impact, the seatback 16 may be moveable relative to the seat bottom 14 from a standard position, as shown in FIG. 1A and in phantom lines in FIG. 1B, to a rear impact position, as shown in solid lines in FIG. 1B. As the seatback 16 moves toward the rear impact position, the device 18 absorbs energy to decrease the impact of the occupant against the seatback 16.

Specifically, the device 18 includes a housing 20 supported on the seat bottom 14, i.e., directly on the seat bottom 14 or through intermediate components, and a rotor 22 supported on the housing 20, i.e., directly on the housing 20 or through intermediate components. The housing 20 and the rotor 22 define a cavity 24 therebetween, and a resilient material 26 is disposed in the cavity 24. The device 18 includes a helical interface 28 between the housing 20 and the rotor 22, and the rotor 22 is moveable relative to the housing 20 along the helical interface 28. As the seatback 16 rotates relative to the seat bottom 14 from the standard position toward the rear impact position, the seatback 16 causes the rotor 22 to rotate relative to the housing 20. When the rotor 22 rotates relative to the housing 20, the resilient material 26 is compressed between the rotor 22 and the housing 20. By allowing the seatback 16 to pivot relative to the seat bottom 14, the resilient material 26 of the device 18 absorbs energy from the occupant, and may assist in reducing deformation to the seat 12, i.e., the seatback 16 and/or the seat bottom 14, during a vehicle impact.

Figure 1B:
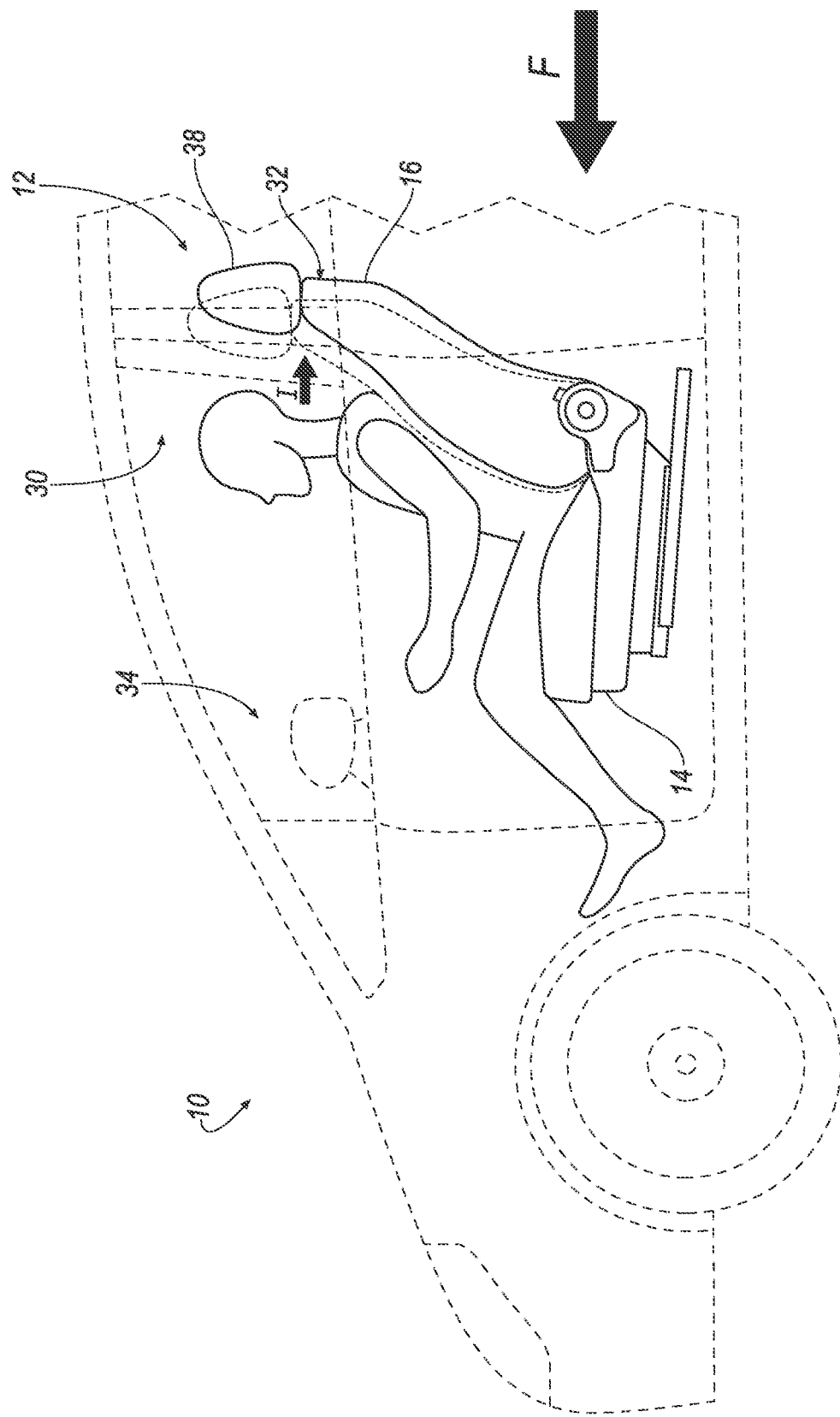
FIG. 1B is a side view of the seatback moved relative to the seat bottom from a standard position to a rear impact position.
Figure 2:
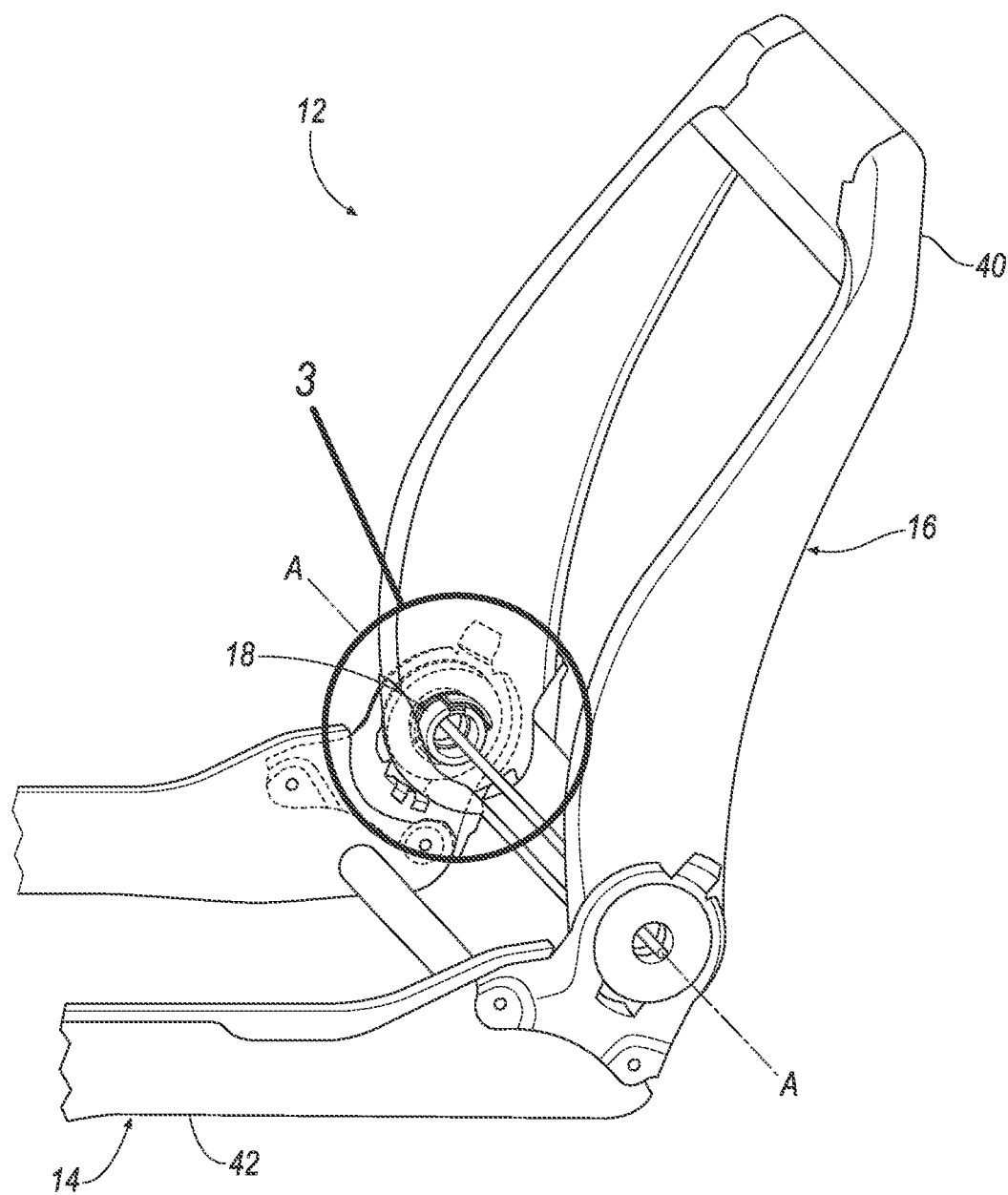
FIG. 2 is a perspective view of a seat including a device supporting the seatback in the standard position on the seat bottom.

With reference to FIGS. 1A and 1B, the vehicle 10 may, for example, be any suitable type of automobile. The vehicle 10 includes a passenger cabin 30 to house occupants, if any, of the vehicle 10. The passenger cabin 30 includes one or more seats 12, e.g., any suitable number of seats 12. The seats 12 may be disposed at any suitable position in the passenger cabin 30. For example, the seats 12 may be front seats 32 disposed at a front 34 of the passenger cabin 30. As another example, the seats 12 may be rear seats 36 spaced from the front seats 32. The rear seats 36 may be, for example, disposed behind the front seats 32 in the passenger cabin 30. The passenger cabin 30 may also include third-row seats (not shown) at a rear of the passenger cabin 30, in which case the front seats 32 may be second-row seats (not numbered) instead of or in addition to being front seats 32. The front seats 32 and the rear seats 36 may be a same or different type of seat. The front seats 32 and rear seats 36 may be any suitable type of seats, e.g., bucket seats, bench seats, etc. The front seats 32 may be, for example, a bucket seat.

The front seats 32 and the rear seats 36 may face in a same or different direction. The front seats 32 and the rear seats 36 may face in any suitable direction. For example, as shown in FIG. 1A, the front seats 32 and the rear seats 36 may each face the front 34 of the passenger cabin 30, i.e., in the same direction. Alternatively, the front seats 32 and the rear seats 36 may each face each other, i.e., in opposite directions. The front seats 32 and the rear seats 36 facing each other may be useful in an autonomous vehicle 10. The front seats 32 and/or the rear seats 36 may be rotatable about a generally horizontal axis to face toward and away from each other.

The seats 12, i.e., the front seats 32 and the rear seats 36, may include the seatback 16, the seat bottom 14, and a head restraint 38. The head restraint 38 may be supported on the seatback 16 and may be stationary or movable relative to the seatback 16. The seatback 16 may be supported on the seat bottom 14 and may extend upwardly from the seat bottom 14. The seatback 16 may be stationary or movable relative to the seat bottom 14. For example, the seatback 16 may be pivotable about the seat bottom 14 from the standard position, shown in FIG. 1A, to the rear impact position, shown in FIG. 1B. The standard position may be any suitable position of the seatback 16 extending upwardly from the seat bottom 14. The rear impact position may be pivoted about the seat bottom 14 away from the occupant, e.g., away from the front 34 of the passenger cabin 30. The rear impact position may be pivoted any suitable amount, i.e., angle, away from the occupant.

The seatback 16, the seat bottom 14, and/or the head restraint 38 may be adjustable in multiple degrees of freedom. Specifically, the seatback 16, the seat bottom 14, and/or the head restraint 38 may themselves be adjustable, in other words, may have adjustable components within themselves, and/or may be adjustable relative to each other.

With reference to FIG. 2, the seat bottom 14 and the seatback 16 may each include a frame 40, 42 engaged with each other. The frame 40 of the seatback 16 may, for example, be supported on the frame 42 of the seat bottom 14. The seatback 16, i.e., the frame 40 of the seatback 16, may be pivotable about the frame 42 of the seat bottom 14 from the standard position to the rear impact position.

The frames 40, 42 may include panels and/or may include tubes, beams, etc. The frame 42 of the seat bottom 14 and the frame 40 of the seatback 16 may be formed of a same or different material. For example, the frames 40, 42 may be formed of any suitable plastic material, e.g., carbon fiber reinforced plastic (CFRP), glass fiber-reinforced semi-finished thermoplastic composite (organosheet), etc. Alternatively, some or all components of the frames 40, 42 may be formed of a suitable metal, e.g., steel or aluminum.

Figure 3A:
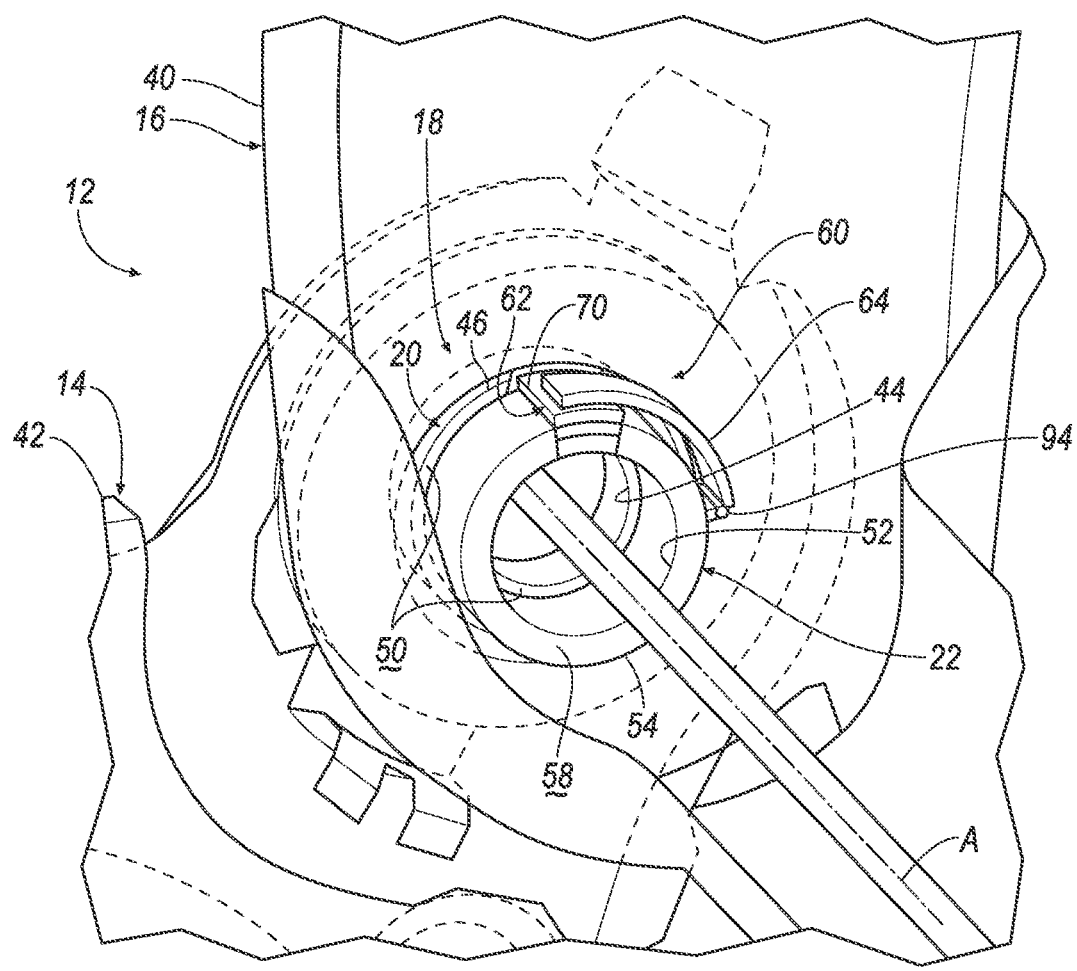
FIG. 3A is a magnified view of the device including a housing supported on the seat bottom and a rotor supported on the housing.

With reference to FIG. 3A, the housing 20 of the device 18 is supported on the seat bottom 14, e.g., the frame 42 of the seat bottom 14, and the rotor 22 of the device 18 is supported on the housing 20. In other words, the housing 20 may be mounted directly to the seat bottom 14, e.g., the frame 42 of the seat bottom 14, or may be supported by the seat bottom 14, e.g., the frame 42 of the seat bottom 14, on one or more intermediate components. Additionally, the rotor 22 may be mounted directly to the housing 20 or may be supported by the housing 20 on one or more intermediate components. The device 18 may be any suitable shape, e.g., annular, cylindrical, etc.

Figure 4:
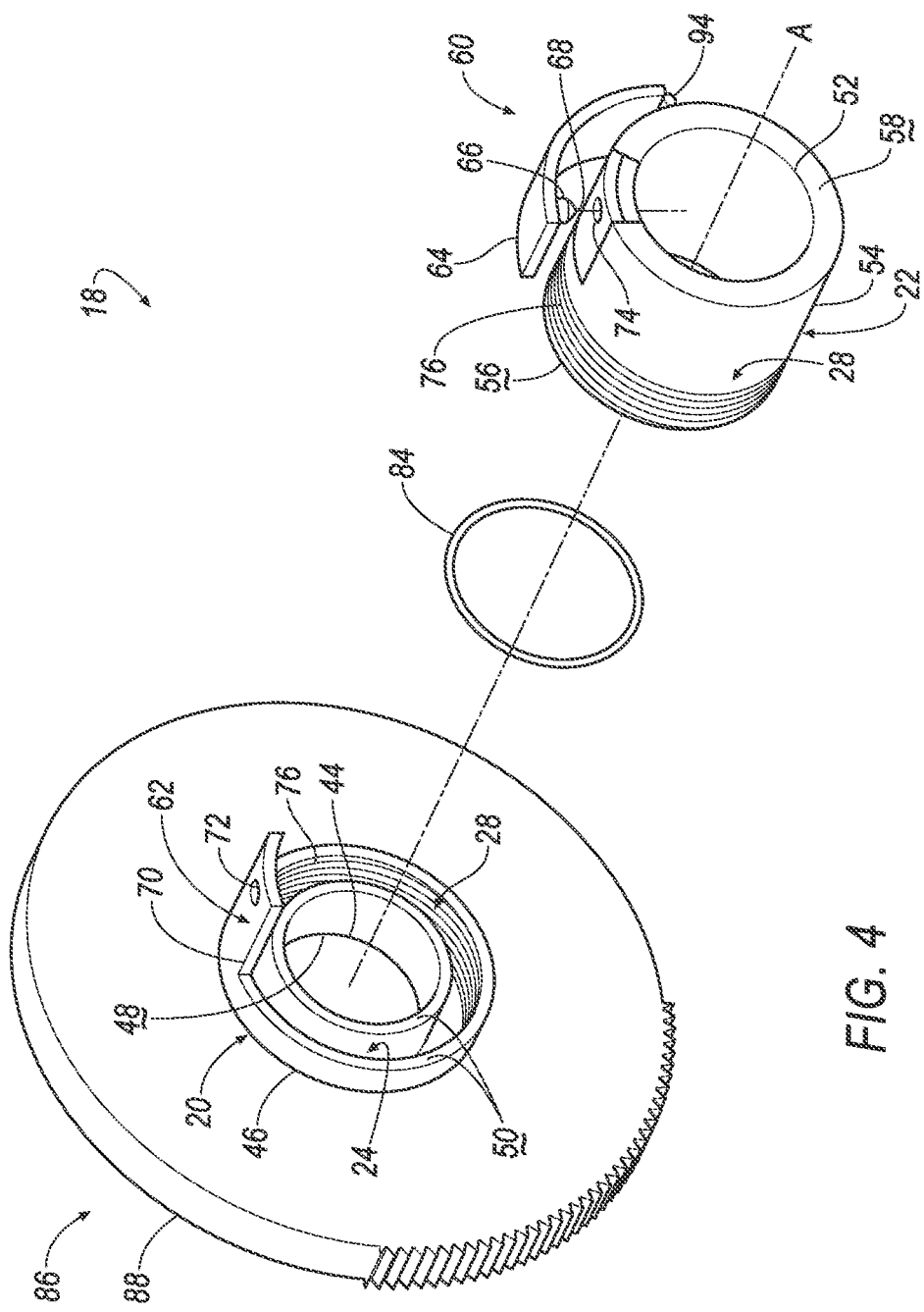
FIG. 4 is an exploded view of the device including an O-ring and a resilient material disposed between the housing and the rotor.

With reference to FIG. 4, the housing 20 may include an inner wall 44 and an outer wall 46 extending annularly around the inner wall 44. The inner wall 44, for example, may extend annularly about an axis A. In other words, the inner wall 44 may be disposed between the axis A and the outer wall 46. The inner wall 44 and the outer wall 46 may be spaced from each other. For example, the inner wall 44 and the outer wall 46 may be radially spaced from each other about the axis A.

With continued reference to FIG. 4, the housing 20 may include a back surface 48 and a front surface 50 spaced from the back surface 48 along the axis A. The housing 20, e.g., the inner wall 44 and the outer wall 46, may extend from the back surface 48 to the front surface 50 along the axis A. The back surface 48 may extend annularly about the axis A from the inner wall 44 to the outer wall 46. The front surface 50 may extend annularly about the axis A along each of the inner wall 44 and the outer wall 46.

With continued reference to FIG. 4, the rotor 22 may include an inner side 52 and an outer side 54 extending annularly around the inner side 52 of the rotor 22. The inner side 52 may, for example, extend annularly about the axis A. In other words, the inner side 52 may be disposed between the axis A and the outer side 54. The inner side 52 and the outer side 54 may be spaced from each other. For example, the inner side 52 and the outer side 54 may be radially spaced from each other about the axis A.

With reference to FIG. 5A, the rotor 22 may be disposed between the inner wall 44 and the outer wall 46 of the housing 20. In other words, the inner side 52 and the outer side 54 of the rotor 22 may be disposed between the inner wall 44 and the outer wall 46 of the housing 20. For example, the inner side 52 of the rotor 22 may be adjacent the inner wall 44 of the housing 20, and the outer side 54 of the rotor 22 may be adjacent the outer wall 46 of the housing 20.

With reference to FIG. 4, the rotor 22 may include an inner surface 56 and an outer surface 58 spaced from the inner surface 56 along the axis A. The rotor 22, e.g., the inner side 52 and the outer side 54, may extend from the inner surface 56 to the outer surface 58 along the axis A. The inner surface 56 and the outer surface 58 of the rotor 22 may each extend annularly about the axis A from the inner side 52 to the outer side 54 of the rotor 22. In other words, both the inner surface 56 and the outer surface 58 extend from the inner side 52 to the outer side 54 of the rotor 22.

With reference to FIGS. 5A and 5B, the rotor 22 may be partially disposed in the housing 20. The inner surface 56 of the rotor 22, for example, may be disposed between the back surface 48 and the front surface 50 of the housing 20. The outer surface 58 of the rotor 22, for example, may be spaced from the front surface 50 of the housing 20 along the axis A. In other words, the front surface 50 of the housing 20 may be disposed between the inner surface 56 and the outer surface 58 of the rotor 22. The inner surface 56 of the rotor 22 may be disposed at any suitable position along the axis A between the back surface 48 and the front surface 50 of the housing 20. In other words, the rotor 22 may extend any suitable amount along the axis A into the housing 20.

With reference to FIG. 4, the cavity 24 may be between the inner wall 44 and the outer wall 46 of the housing 20. In other words, the outer wall 46 may be spaced from the inner wall 44 by the cavity 24. The cavity 24 may, for example, extend annularly around the inner wall 44 between the inner wall 44 and the outer wall 46. In other words, the cavity 24 may extend from the inner wall 44 to the outer wall 46 of the housing 20. Additionally, the cavity 24 may be between the back surface 48 of the housing 20 and the inner surface 56 of the rotor 22. The cavity 24 may, for example, extend along the axis A from the back surface 48 of the housing 20 to the inner surface 56 of the rotor 22.

The rotor 22 and the housing 20 may be formed of a same or different material. The rotor 22 and the housing 20 may be formed of any suitable material. For example, the rotor 22 and the housing 20 may be formed of any suitable metal, e.g., steel, aluminum, etc. Alternatively, the rotor 22 and the housing 20 may be formed of plastic or any other suitable material.

Figure 3B:
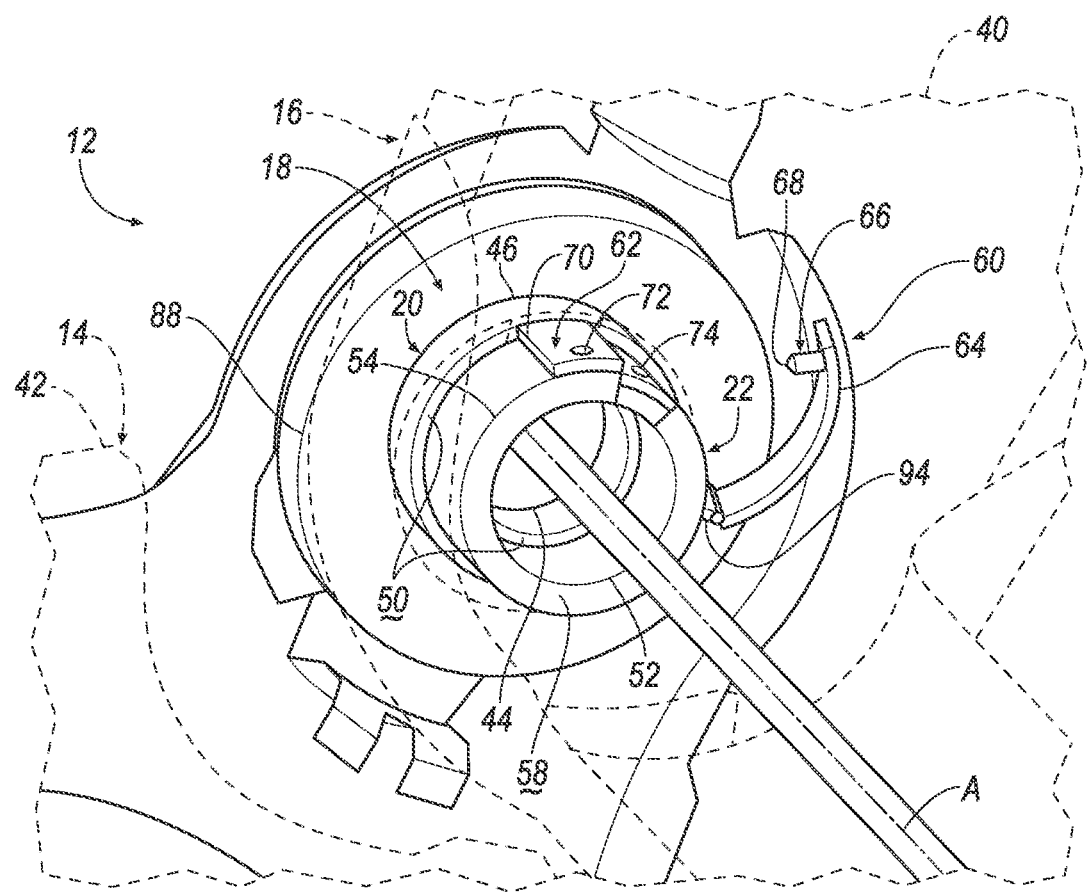
FIG. 3B is a magnified view of the device with the seatback in the rear impacted position and the rotor moved relative to the housing.

The rotor 22 and the housing 20 may include locking elements 60, 62 releasably engageable with each other. The locking element 60 of the rotor 22 may be engaged with the locking element 62 of the housing 20 in a locked position to prevent the rotor 22 from moving relative to the housing 20, as shown in FIG. 3A. The locking element 60 of the rotor 22 may be disengaged with the locking element 62 of the housing 20 in an unlocked position to allow the rotor 22 to move relative to the housing 20, as shown in FIG. 3B.

The locking element 60 of the rotor 22 may include an arm 64 and a finger 66 disposed on the arm 64. The arm 64 may be pivotally connected to the rotor 22, e.g., the outer side 54 of the rotor 22. Specifically, the device includes a hinge 94 between the arm 64 and the rotor 22, e.g., the outer wall, 54, to allow the arm 64 to pivot relative to the rotor 22. The arm 64 may, for example, be pivotable from the locked position to the unlocked position. In the locked position, the arm 64 may be elongated along the outer side 54 of the rotor 22 about the axis A, as shown in FIG. 3A. For example, the arm 64 may be curved circumferentially along the outer side 54 of the rotor 22 in the locked position. In other words, the arm 64 may extend partially around the outer side 54 of the rotor 22 in the locked position. The arm 64 may be connected to the rotor 22, e.g., the outer side 54 of the rotor 22, in any suitable manner, e.g., fasteners, adhesive, etc.

The finger 66 may include a distal end 68 spaced from the arm 64, as shown in FIG. 4. The finger 66 may extend from the arm 64 to the distal end 68. The distal end 68 of the finger 66 may, for example, be disposed between the axis A and the arm 64 in the locked position. In the locked position, the finger 66 may, for example, extend from the arm 64 towards the axis A, as shown in FIGS. 4 and 5A. In other words, the finger 66 may radially extend from the arm 64 towards the axis A in the locked position.

The finger 66 may have any suitable shape. For example, the finger 66 may taper from the arm 64 to the distal end 68. Alternatively, the finger 66 may be a frustum, trapezoid, or any other suitable shape.

With continued reference to FIG. 4, the locking element 62 of the housing 20 may include a tab 70 and a hole 72 extending through the tab 70 transverse to the axis A. The tab 70 may, for example, be disposed on the outer wall 46 of the housing 20. The tab 70 may extend along the axis A from the front surface 50 of the housing 20 towards the outer surface 58 of the rotor 22. In other words, the tab 70 may be adjacent, i.e., extend along, the outer side 54 of the rotor 22. Specifically, the tab 70 may abut the outer side 54 of the rotor 22. Additionally, the tab 70 may be curved circumferentially along the outer wall 46 of the housing 20.

With continued reference to FIG. 4, the hole 72 may be spaced from the front surface 50 of the housing 20 along the axis A. For example, the hole 72 may be disposed between the front surface 50 of the housing 20 and the outer surface 58 of the rotor 22. The hole 72 may extend through the tab 70 to the rotor 22, e.g. the outer side 54 of the rotor 22. The hole 72 may be designed to receive the finger 66. In other words, the hole 72 may be sized, shaped, and positioned to receive the finger 66 when the arm 64 is in the locked position. Additionally, or alternatively, the rotor 22 may include a hole 74 aligned with the hole of the tab 70, as shown in FIG. 5A. The hole 74 of the rotor 22 may extend any suitable amount through the rotor 22. For example, the hole 74 of the rotor 22 may extend from the outer side 54 to the inner side 52 of the rotor 22, i.e., completely through the rotor 22, as shown in FIG. 5A. Alternatively, the hole 74 of the rotor 22 may extend from the outer side 54 towards the inner side 52 of the rotor 22, i.e., partially through the rotor 22. In this situation, the finger 66 may extend through both the hole of the tab 70 and the hole of the rotor 22 in the locked position.

With reference to FIGS. 4-5B, the helical interface 28 is between the housing 20 and the rotor 22, as set forth above. The rotor 22 is moveable relative to the housing 20 along the helical interface 28. The rotor 22 may be rotationally and translationally moveable relative to the housing 20 along the helical interface 28. For example, the rotor 22 may rotate about the axis A relative to the housing 20 when the seatback 16 moves the rotor 22. Additionally, the rotor 22 may move fore-and-aft along the axis A relative to the housing 20 when the seatback 16 moves the rotor 22.

With reference to FIGS. 5A and 5B, the helical interface 28 may be disposed in the cavity 24. The helical interface 28, for example, may be on at least one of the inner wall 44 and the outer wall 46 of the housing 20. Additionally, the helical interface 28 may be on at least one of the inner side 52 and the outer side 54 of the rotor 22. Specifically, the helical interface 28 may be on adjacent components of the housing 20 and the rotor 22. For example, the helical interface 28 may be on the outer wall 46 of the housing 20 and the outer side 54 of the rotor 22. Alternatively, the helical interface 28 may be on the inner wall 44 of the housing 20 and the inner side 52 of the rotor 22.

The helical interface 28 may include any suitable interface. For example, the helical interface 28 may include threads 76 disposed on both the housing 20, i.e., the outer wall 46, and the rotor 22, i.e., the outer side 54, as shown in FIGS. 5A and 5B. The threads 76 of the rotor 22 and the threads 76 of the housing 20 may be engageable with each other. In other words, the threads 76 of the rotor 22 may be designed to receive, i.e., mesh, with the threads 76 of the housing 20. The threads 76 of the rotor 22 may, for example, move helically about the axis A along the threads 76 of the housing 20 when the seatback 16 moves the rotor 22. As another example, the helical interface 28 may include a groove (not shown) and a tongue (not shown) disposed in the groove. The groove may extend helically around one of the rotor 22 and the housing 20 and the tongue may be disposed on the other of the rotor 22 and the housing 20. In this situation, the tongue may move within the groove rotationally about the axis A and translationally along the axis A when the seatback 16 moves the rotor 22. In other words, the tongue may move helically about the axis A in the groove.

With reference to FIGS. 5A and 5B, the resilient material 26 is disposed in the cavity 24, as set forth above. In other words, the housing 20 and the rotor 22 contain the resilient material 26 and prevent the resilient material 26 from freely flowing out of the cavity 24. The resilient material 26 may fill the cavity 24, i.e., the cavity 24 may contain only the resilient material 26. In other words, the resilient material 26 may abut both the housing 20 and the rotor 22 in the cavity 24. For example, the resilient material 26 may abut each of the back surface 48, the inner wall 44, the outer wall 46 and the inner surface 56.

The resilient material 26 may include a liquid 80 and hydrophobic nanoporous particles 78 in the liquid 80. The resilient material 26 may be made of different substances that remain separate, e.g., a colloid or a suspension. For example, the resilient material 26 may be a colloid of the hydrophobic nanoporous particles 78 in the liquid 80. The liquid 80 may be any inert, i.e., nonreactive, liquid 80, e.g., water, lithium chloride, etc. Alternatively, the resilient material 26 may be made of a solid foam, e.g., an open cell foam, material.

The particles 78 are nanoporous, i.e., the particles 78 have nanopores 82. The nanopores 82 may have diameters on the order of 1 nm to 100 nm. The particles 78 may be formed of, for example, silicon. The particles 78 are hydrophobic, that is, tending to repel water or fail to mix with water. The particles 78 may be formed of a material that is hydrophobic, or the particles may have hydrophobic surface treatment, e.g., chlorotrimethylsilane or chlorodimethyloctylsilane in toluene.

Figure 6A:
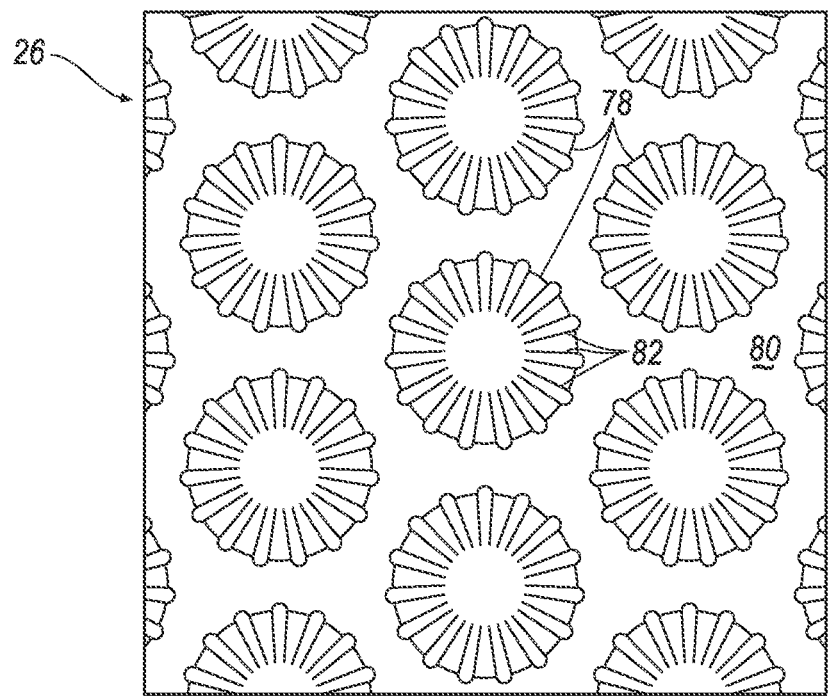
FIG. 6A is a diagram of the resilient material in the uncompressed state.
Figure 6B:
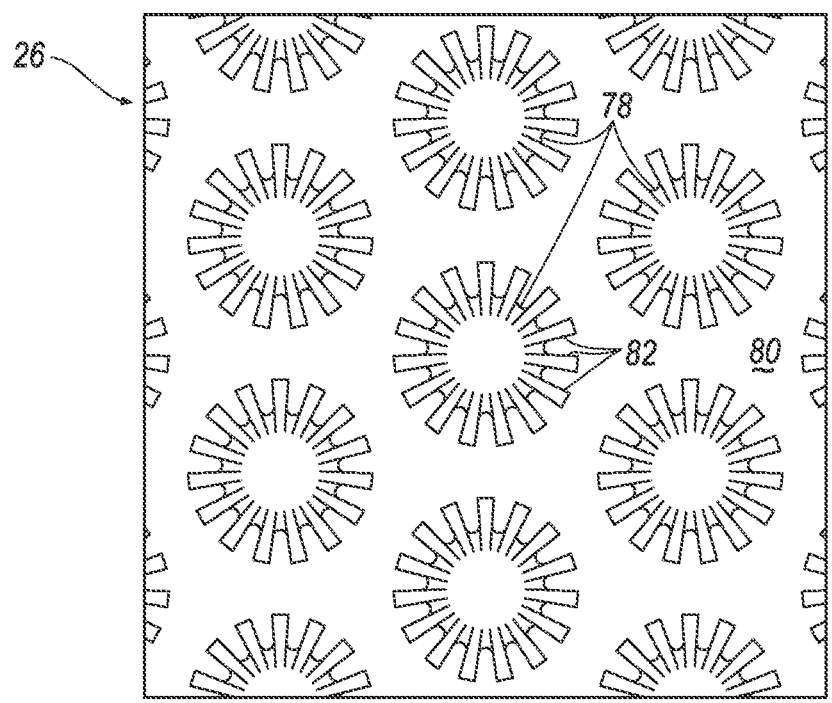
FIG. 6B is a diagram of the resilient material in the compressed state.

The resilient material 26 may be compressible between the housing 20 and the rotor 22 from the uncompressed state, as shown in FIG. 5A, to the compressed state, as shown in FIG. 5B. For example, the resilient material 26 may be compressed by the inner surface 56 of the rotor 22 and the back surface 48 of the housing 20 when the seatback 16, i.e., the rotor 22, moves from the standard position to the rear impact position. In the uncompressed state, air fills the nanopores 82 of the particles 78, and surface tension prevents the liquid 80 from entering the nanopores 82, as shown in FIG. 6A. As the seatback 16, i.e., the rotor 22, moves from the standard position to the rear impact position, a pressure may be applied to the resilient material 26 by the housing 20 and the rotor 22. In the compressed state, the pressure becomes sufficient to overcome surface tension, and the liquid 80 enters the nanopores 82 and compresses the air inside the nanopores 82, as shown in FIG. 6B. The resilient material 26 may absorb energy from the occupant when the liquid 80 enters the nanopores 82, i.e., when the resilient material 26 is compressed to the compressed state. Once the nanopores 82 are mostly full of the liquid 80, in the compressed state, the pressure increases substantially. The volume of the resilient material 26 may be reduced by as much as 80%. The pressure is affected by the choice of material for the particles 78, the average size of the particles 78, the number of nanopores 82 per particle, the average size of the nanopores 82, the surface treatment, and the choice of liquid 80.

The seatback 16, i.e., the rotor 22, is moveable from the standard position in which the nanopores 82 are substantially filled with are to the rear impact position in which the nanopores 82 are substantially filled with the liquid 80. The volume of the resilient material 26 when the seatback 16, i.e., the rotor 22, is in the rear impact position may be at most half of the volume, i.e., half or less than half of the volume, e.g., as little as 20% of the volume, of the resilient material 26 when the seatback 16, i.e., the rotor 22 is in the standard position.

The housing 20 may lack outlets, i.e., no routes are provided for the resilient material 26 to escape the housing 20. The compression of the resilient material 26 may be partially or fully reversible. After the vehicle impact, the resilient material 26 may expand from the compressed state to the uncompressed state when the seatback 16, i.e., the rotor 22, moves from the rear impact position to the standard position. In other words, the device 18 may be resettable after the vehicle impact. In this situation, as the pressure decreases, the air compressed in the nanopores 82 expands, and the volume occupied by the resilient material 26 expands. In other words, the liquid 80 evacuates, i.e., exits, the nanopores 82.

With reference to FIG. 4, the device 18 may include an O-ring 84 disposed in the cavity 24. The O-ring 84 may be spaced from the helical interface 28 by the cavity 24. In other words, the O-ring 84 and the helical interface 28 may be on opposite sides of the cavity 24. The O-ring 84 may be formed of any suitable material, e.g., rubber, plastic, etc.

The O-ring 84 may, for example, be sandwiched between the housing 20, e.g., the inner wall 44 of the housing 20, and the rotor 22, e.g., the inner side 52 of the rotor 22, as shown in FIGS. 5A and 5B. In other words, the O-ring 84 may be compressed between the housing 20 and the rotor 22. The O-ring 84, for example, may abut at least one of the inner wall 44 and the outer wall 46 of the housing 20. Additionally, the O-ring 84 may abut at least one of the inner side 52 and the outer side 54 of the rotor 22. Specifically, the O-ring 84 may abut adjacent components of the housing 20 and the rotor 22. For example, the O-ring 84 may abut the inner wall 44 of the housing 20 and the inner side 52 of the rotor 22. In this situation, the O-ring 84 may be designed to receive the inner wall 44 of the housing 20. In other words, the O-ring 84 may be sized, shaped, and positioned to receive the inner wall 44 of the housing 20. For example, the O-ring 84 may extend annularly around the inner wall 44 of the housing 20 between the inner wall 44 of the housing 20 and the inner side 52 of the rotor 22. Additionally, the O-ring 84 may, for example, extend annularly around the inner side 52 of the rotor 22 between the inner wall 44 of the housing 20 and the inner side 52 of the rotor 22. Alternatively, the O-ring 84 may abut the outer wall 46 of the housing 20 and the outer side 54 of the rotor 22.

The device 18 may include a reclining mechanism 86 for allowing the seatback 16 to recline, i.e., pivot, relative to the seat bottom 14. The reclining mechanism 86 may include a gear 88 fixed to one of the housing 20 and the rotor 22. For example, the gear 88 may be fixed to the housing 20, e.g. the outer wall 46, as shown in FIG. 3A. The gear 88, i.e., the reclining mechanism 86, may support the housing 20 on the frame 42 of the seat bottom 14. The gear 88 may, for example, be rotatable relative to the seat bottom 14 about the axis A. The housing 20 may, for example, rotate with the gear 88 about the axis A. The gear 88 may be fixed to one of the housing 20 and the rotor 22 in any suitable manner, e.g., welding, fasteners, adhesive, etc.

The other of the housing 20 and the rotor 22 may be fixed to the seatback 16. Specifically, the other of the housing 20 and the rotor 22 may be fixed to the frame 40 of the seatback 16. For example, the rotor 22, e.g., the outer side 54, may be fixed to the frame 40 of the seatback 16, as shown in FIG. 3A. In this situation, the rotor 22 may rotate with the seatback 16, e.g., from the standard to position to the rear impact position. The other of the housing 20 and the rotor 22 may be fixed to the seatback 16, e.g., the frame 40 of the seatback 16, in any suitable manner, e.g., welding, fasteners, adhesive, etc.

The seat bottom 14 may include a locking gear 90 for selectively locking the seatback 16, e.g., the device 18, relative to the seat bottom 14 and for selectively unlocking the seatback 16, e.g., the device 18, relative to the seat bottom 14 to pivot the seatback 16 relative to the seat bottom 14. For example, the locking gear 90 may be releasably engageable with the device 18. Specifically, the locking gear 90 may be releasably engageable with the gear 88 of the reclining mechanism 86. In other words, the locking gear 90 may be engageable between a locked position, shown in FIG. 3C, and an unlocked position to interact with the gear 88 of the reclining mechanism 86.

In the unlocked position, the gear 88 of the reclining mechanism 86 may move with the seatback 16, e.g., the frame 40 of the seatback 16. In other words, in the unlocked position, the gear 88, the device 18, and the seatback 16, e.g., the frame 40 of the seatback 16, may all rotate together. For example, the locking gear 90 may be disengaged from the locked position to the unlocked position to allow the gear 88 of the reclining mechanism 86 to rotate, i.e., to allow the seatback 16 to recline, relative to the seat bottom 14. In the locked position, the gear 88 and the housing 20 may be fixed relative to the seat bottom 14. For example, the locking gear 90 88 may be engaged from the unlocked position to the locked position to prevent the gear 88 of the reclining mechanism 86 from rotating, i.e., to lock the seatback 16, relative to the seat bottom 14. In this situation, the seatback 16, e.g., the frame 40 of the seatback 16, and the rotor 22 are in the standard position, i.e., able to move to the rear impact position.

The locking gear 90 may be moveably attached to the seat bottom 14. Specifically, the locking gear 90 may be moveably attached to the frame 42 of the seat bottom 14. For example, the locking gear 90 may be moveable from the locked position to the unlocked position. The locking gear 90 may, for example, be pivotable relative to the frame 42 of the seat bottom 14 from the locked position to the unlocked position. The locking gear 90 may be biased in the locked position by a spring. The locking gear 90 may be attached to frame 42 of the seat bottom 14 in any suitable manner, e.g., fasteners, pin-in-slot, etc.

Figure 3C:
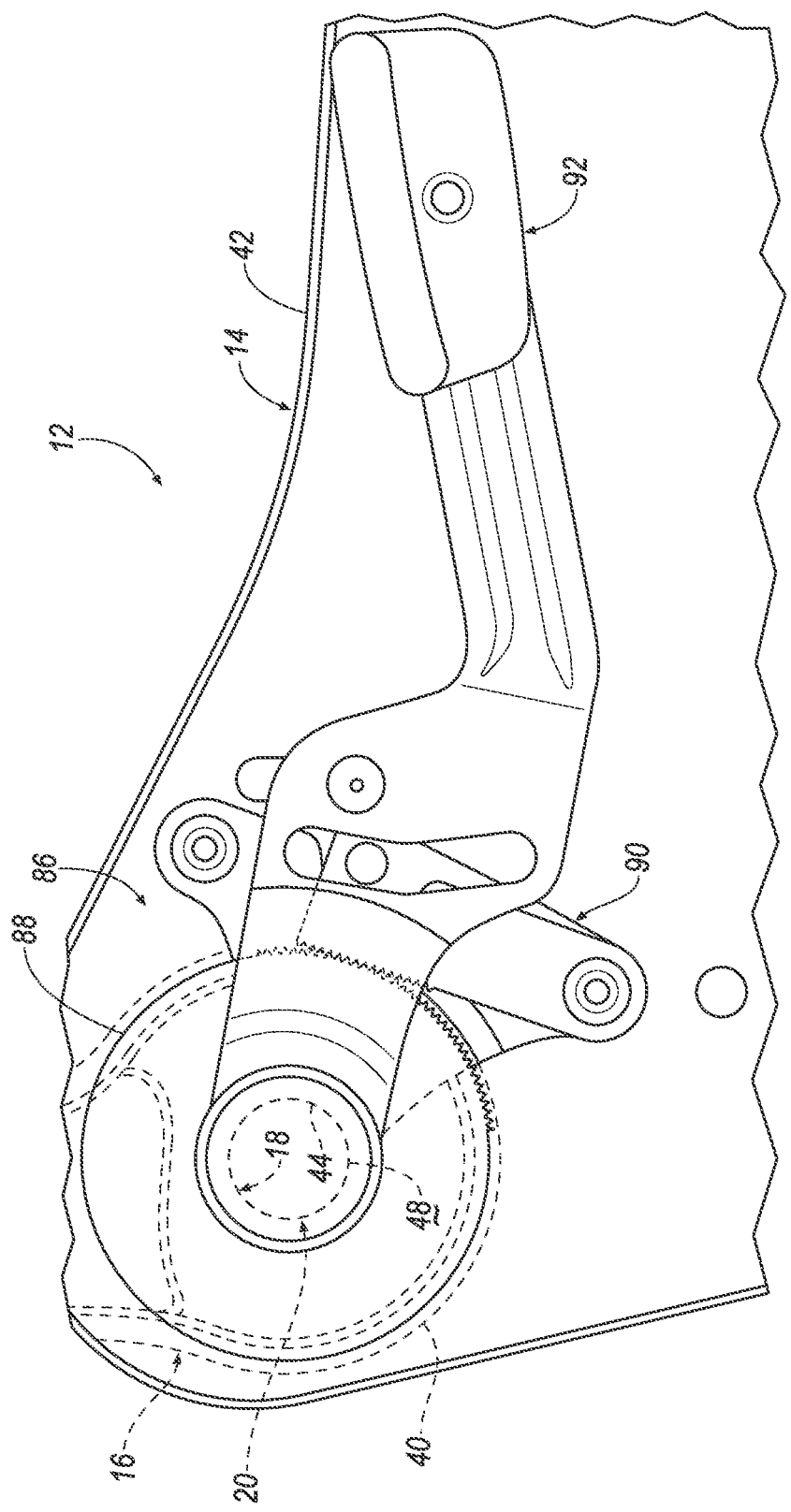
FIG. 3C is a side view of the device including a reclining mechanism engaged with a locking gear on the seat bottom

The locking gear 90 and the gear 88 of the reclining mechanism 86 may be engageable with each other in any suitable manner. For example, both the locking gear 90 and the gear 88 of the reclining mechanism 86 may include teeth (not number) engageable with each other, as shown in FIG. 3C. In other words, the teeth of the locking gear 90 may mesh with the teeth of the gear 88 of the reclining mechanism 86. Alternatively, the locking gear 90 and the gear 88 of the reclining mechanism 86 may be frictionally engaged with each other.

The locking gear 90 and the gear 88 of the reclining mechanism 86 may be formed of a same or different material. The locking gear 90 and the gear 88 of the reclining mechanism 86 may be formed of any suitable material. For example, the locking gear 90 and the gear 88 of the reclining mechanism 86 may be formed of any suitable metal, e.g., steel, aluminum, etc. Alternatively, the locking gear 90 and the gear 88 of the reclining mechanism 86 may be formed of plastic or any other suitable material.

With reference to FIG. 3C, a lever 92 may be connected to the locking gear 90 on the seat bottom 14 for moving the locking gear 90 from the locked position to the unlocked position. The lever 92 may be moveable relative to the frame 42 of the seat bottom 14. The locking gear 90, for example, may move with the lever 92. When the lever 92 moves, the lever 92 may move the locking gear 90 from the locked position to the unlocked position. In other words, the lever 92 may overcome the bias from the spring.

The lever 92 may be connected to the locking gear 90 in any suitable manner. For example, the lever 92 may be connected to the locking gear 90 by a pin-in-slot, as shown in FIG. 3C. Alternatively, the lever 92 may be fixed to the locking gear 90 by welding, fasteners, or any other suitable manner.

The occupant may occupy the seat 12 with the seatback 16 in the standard position under normal operation conditions. During normal operation, the reclining mechanism 86 may be engaged with, i.e., fixed to, the locking gear 90 of the seat bottom 14. During a vehicle impact, the vehicle 10 may be subjected to a force F. The force F may cause the vehicle 10 to decelerate faster than the occupant. During the vehicle impact, the momentum of the vehicle may cause the finger 66 of the arm 64 to disengage from the hole 72 of the tab 70. In other words, vehicle momentum may cause the locking elements 60, 62 of the rotor 22 and the housing 20 to disengage from the locked position to the unlocked position. Specifically, the finger 66 may disengage from the hole 72, and the arm 64 may pivot about the hinge 94 to the unlocked position. In the unlocked position, the rotor 22 may be moveable relative to the housing 20. When the vehicle 10 decelerates, the momentum of the occupant may cause the occupant to impact the seatback 16 and exert an occupant force I on the seatback 16, as shown in FIG. 1B. When the occupant impacts the seatback 16, the reclining mechanism 86 may remain engaged, i.e., fixed, to the locking gear 90 of the seat bottom 14. In this situation, the device 18 may allow the seatback 16 to pivot relative to the seat bottom 14, i.e., move from the standard position to the rear impact position. When the seatback 16 is impacted by the occupant, the seatback 16, e.g., the frame 40 of the seatback 16, may move the rotor 22, i.e., rotate the rotor 22 relative to the housing 20 about the axis A. Additionally, the helical interface 28 may allow the rotor 22, e.g., the inner surface 56, to translationally move along the axis A towards the back surface 48 of the housing 20. In this situation, the resilient material 26 may be compressed between the inner surface 56 of the rotor 22 and the back surface 48 of the housing 20. For example, when the resilient material 26 is hydrophobic nanoporous particles 78, as described above, during the compression of the resilient material 26, the liquid 80 may be forced into the nanopores 82 of the hydrophobic nanoporous particles 78. When the liquid 80 is forced into the nanopores 82, the resilient material 26 may absorb energy of the occupant force I. The device 18 may assist in absorbing energy from the occupant and reducing damage to the seat 12, e.g., seatback 16, seat bottom 14, locking gear 90, etc., during a vehicle impact.

After the vehicle impact, the device 18 may be reset. In other words, the device 18 may be reusable. In this situation, the seatback 16 may be pivoted from the rear impact position to the standard position. In this situation, the rotor 22, e.g., the inner surface 56, may translationally move relative to the housing 20 along the axis A away from the back surface 48 of the housing 20. When the rotor 22 moves away from the back surface 48 of the housing 20, the liquid 80 may be released from the nanopores 82 of the hydrophobic nanoporous particles 78. In other words, the resilient material 26 may return to the uncompressed state.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A device comprising:
    a housing;
    a rotor supported on the housing, the housing and the rotor defining a cavity sealed therebetween;
    the cavity extending along an axis from the housing to the rotor;
    the housing and the rotor including locking elements releasably engaged with each other, the locking elements are moveable from a locked position engaged with each other to an unlocked position disengaged with each other as a result of a change in momentum from an impact;
    a helical interface between the housing and the rotor, the rotor moveable relative to the housing along the helical interface as a result of the locking elements disengaging; and
    a resilient material maintained within the cavity, the housing and the rotor compressing the resilient material along the axis as a result of relative rotation between the housing and the rotor.

2. The device of claim 1, wherein the housing includes an inner wall and an outer wall extending annularly about the inner wall, and the cavity extends annularly about the inner wall between the inner wall and the outer wall.

3. The device of claim 2, wherein the helical interface is in the cavity on at least one of the inner wall and the outer wall.

4. The device of claim 1, further comprising an O-ring disposed in the cavity, the O-ring abutting both the housing and the rotor.

5. The device of claim 1, wherein the resilient material includes a liquid and hydrophobic nanoporous particles in the liquid.

6. The device of claim 1, wherein the resilient material abuts both the rotor and the housing in the cavity.

7. A seat comprising:
    a seat bottom and a seatback;
    a housing fixed relative to one of the seatback and the seat bottom;
    a rotor fixed relative to the other of the seatback and the seat bottom;
    the housing and the rotor include locking elements releasably engaged with each other, the locking elements are moveable from a locked position engaged with each other to an unlocked position disengaged with each other as a result of a change in momentum from a vehicle impact;
    a helical interface between the housing and the rotor, the rotor moveable relative to the housing along the helical interface as a result of relative rotation between the seat bottom and the seatback;
    the housing and the rotor defining a cavity sealed therebetween; and
    a resilient material maintained within the cavity.

8. The seat of claim 7, wherein the housing includes an inner wall and an outer wall extending annularly about the inner wall, and the cavity extends annularly about the inner wall between the inner wall and the outer wall.

9. The seat of claim 8, wherein the helical interface is in the cavity on at least one of the inner wall and the outer wall.

10. The seat of claim 7, wherein the helical interface includes threads disposed on both the housing and the rotor, and the threads of the housing and the threads of the rotor are engageable with each other.

11. The seat of claim 7, wherein the resilient material includes a liquid and hydrophobic nanoporous particles in the liquid.

12. The seat of claim 7, wherein the resilient material abuts both the rotor and the housing in the cavity.

13. The seat of claim 7, further comprising a reclining mechanism including a gear fixed to one of the housing and the rotor.

14. The seat of claim 13, wherein the seat bottom includes a locking gear releasably engageable with the gear of the reclining mechanism.

15. The seat of claim 7, wherein the seat bottom includes a locking gear releasably engageable with one of the housing and the rotor.

16. The seat of claim 7, further comprising an O-ring disposed in the cavity, the O-ring abutting both the housing and the rotor.

17. The seat of claim 7, wherein the helical interface is in the cavity.

18. The seat of claim 7, wherein the locking elements include a hole disposed the housing and an arm pivotally connected to the rotor.

19. A seat comprising:
    a seat bottom and a seatback;
    a housing fixed relative to one of the seatback and the seat bottom;
    a rotor fixed relative to the other of the seatback and the seat bottom;
    the housing and the rotor include locking elements releasably engaged with each other, the locking elements are moveable from a locked position engaged with each other to an unlocked position disengaged with each other as a result of a change in momentum from a vehicle impact;
    a helical interface between the housing and the rotor, the rotor moveable relative to the housing along the helical interface;
    the housing and the rotor defining a cavity sealed therebetween, the cavity extending along an axis from the housing to the rotor; and
    a resilient material maintained within the cavity, the housing and the rotor compressing the resilient material along the axis as a result of relative rotation between the seat bottom and the seatback.

20. The seat of claim 19, wherein the rotor is moveable relative to the housing along the helical interface as a result of relative rotation between the seat bottom and the seatback.

* * * * *